United States Patent [19]

Lorch

[11] 3,745,389
[45] July 10, 1973

[54] SUPERCOOLED DYNAMO ELECTRIC MACHINES

[75] Inventor: Hugh Olaf Lorch, Stafford, England

[73] Assignee: The English Electric Company Limited, London, England

[22] Filed: Aug. 8, 1969

[21] Appl. No.: 848,521

[30] Foreign Application Priority Data
Aug. 9, 1968 Great Britain.................... 38,193/68

[52] U.S. Cl. ................................................. 310/52
[51] Int. Cl. ............................................. H02k 9/19
[58] Field of Search........................... 310/10, 40, 52

[56] References Cited
UNITED STATES PATENTS

| | | | |
|---|---|---|---|
| 3,517,231 | 6/1970 | Massar................................... | 310/52 |
| 3,005,117 | 10/1961 | Buchhold.............................. | 310/40 |
| 3,242,418 | 3/1966 | Mela et al......................... | 310/52 X |
| 3,368,087 | 2/1968 | Madsen............................. | 310/40 X |

Primary Examiner—D. F. Duggan
Attorney—Misegades & Douglas, Keith Misegades and George R. Douglas, Jr.

[57] ABSTRACT

A synchronous dynamo electric machine having a stator and a rotor in which the rotor has a superconductive direct current field winding which is maintained at a very low temperature. In order to shield the superconductive field winding from alternating or suddenly changing magnetic fields which would otherwise be set up therein the rotor includes an outer annular shield of good electrically conductive material. The rotor winding is thus protected against the effects of negative sequence and zero sequence components of stator current due to unbalance of the power output of the machine. This unbalance can arise from a fault in an associated transmitting system, or a fault in the stator, or a sudden change in the power output of the machine.

42 Claims, 9 Drawing Figures

3,745,389

SUPERCOOLED DYNAMO ELECTRIC MACHINES

This invention relates to synchronous dynamo electric machines in which the rotor carries a direct current field winding. The invention is therefore particularly related to large alternating current generators.

In such a machine, for example, a 660 MW 2-pole 3,000 r.p.m. generator, the total losses in the rotor including direct current losses, eddy currents, losses in the rotor iron, and windage and bearing losses, sum to 4 MW or more and the capitalized value of this power is at least 300,000 pounds.

In addition, the continuous output of such a machine is often limited since an increase in stator output current demands an increase in rotor current beyond its thermal limit.

Reduction of these losses would therefore have considerable economic advantages and the present invention discloses a rotor construction and cooling arrangement by which such losses are reduced. It is not at present feasible to make the stator, that is the armature, of an alternating current generator superconductive because present superconductors dissipate considerable power under the conditions of alternating current and alternating magnetic field that occur in the stator.

According to one aspect of the invention there is provided a synchronous dynamo electric machine having a stator and a rotor, the rotor having a superconductive direct current field winding which is maintained at a very low temperature, including an outer annular shield of good electrically conductive material mounted on the rotor and extending beyond the ends of the rotor winding for shielding the rotor winding from alternating or suddenly changing magnetic fields which would otherwise be set up therein by the stator.

In order that the invention may be better understood, one embodiment thereof will now be described with reference to the accompanying drawings, in which:

FIG. 1 is a composite diagrammatic drawing of parts of the stator and rotor of a 660 MW alternating current generator showing the non-drive end of part of the rotor above the center line and the drive end of part of the rotor below the center line;

FIG. 2 diagrammatically shows part of the rotor at the drive end between the lines A—A and B—B;

FIG. 3 diagrammatically shows part of the rotor at the non-drive end between the lines C—C and D—D;

In order make the description of the invention as simple as possible it will, where convenient, be described in parts under the heading "Stator and Rotor Construction," "Rotor Cooling and Operation," and "Rotor Winding."

STATOR AND ROTOR CONSTRUCTIONS

Figure 1:
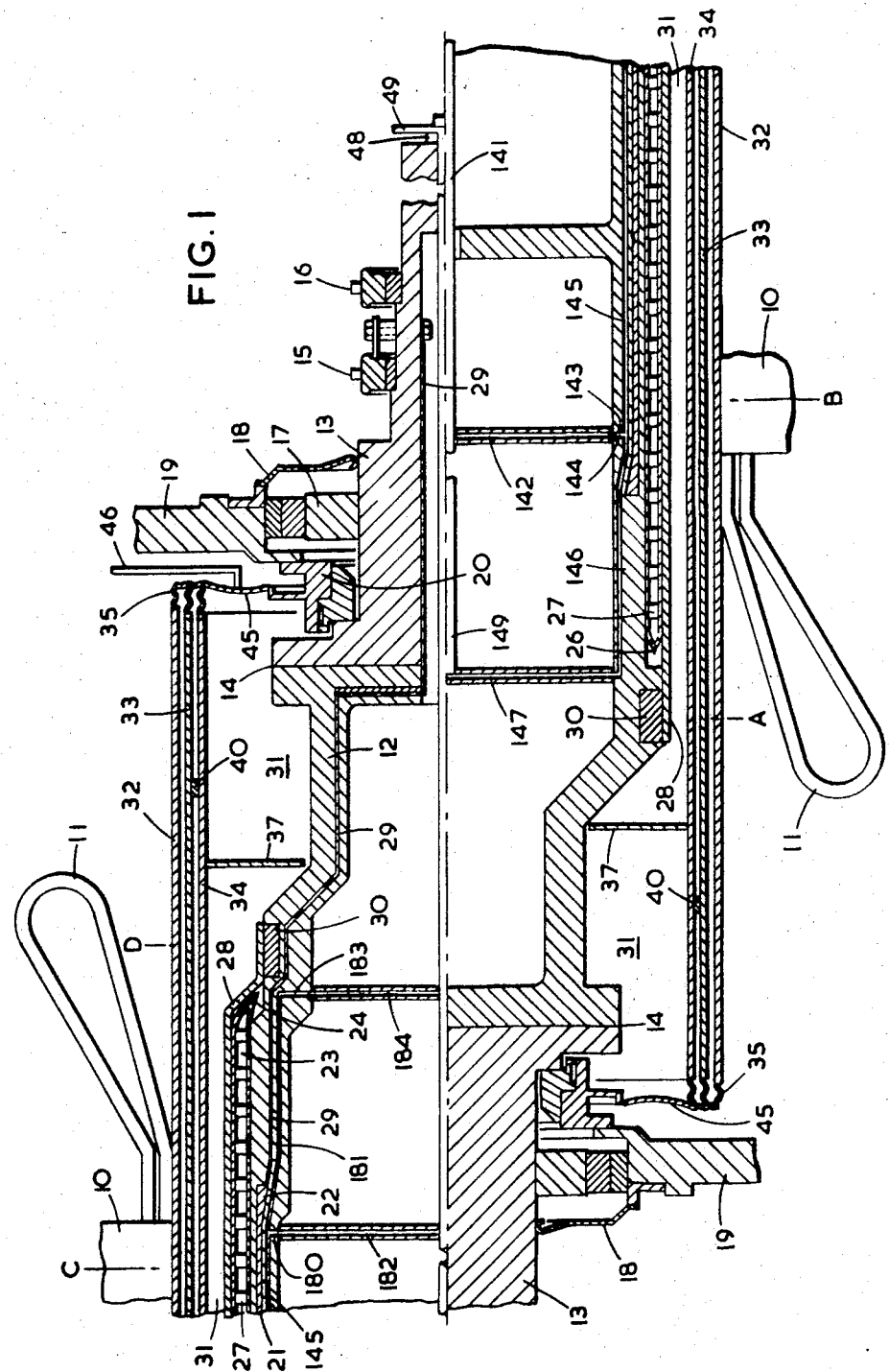

In FIG. 1, part of the non-drive end of the rotor is shown above the center line together with part of the machine stator. This latter part of the machine is indicated by the reference 10 with the overhanging stator winding end turns shown at 11. The stator of the machine may be of any conventional design, for example, gas cooled or water cooled, with gas or water, as the case may be, flowing through the stator and/or the stator conductors. Alternatively, if at any time suitable superconducting materials become available which operate satisfactorily while carrying alternating currents and operating in fluctuating magnetic fields then the stator winding could be of cryogenic construction and operation. Another possibility is to construct the stator windings from very pure metal, such as copper or aluminum, and cool them to such a low temperature that the power expended in cooling is less than the reduction of ohmic loss in the windings resulting from operation at the low temperature.

The rotor has an annular body 12 of a suitable robust electrically insulating material, such for example, as an epoxy-resin glass-fiber composition, and the rotor shaft ends 13 at each end of the machine are of steel. Magnetic steel to reduce the reluctance of the flux path within the rotor is unnecessary and may be undesirable. The division between the rotor body 12 and the rotor shaft ends 13 is indicated at points 14. The shaft ends and rotor body are coupled by any suitable means (not shown).

One rotor shaft end 13 carries slip rings 15 and 16 of conventional construction and both shaft ends are supported in a bearing 17 surrounded by a cover 18 and the bearing joins with the stator housing 19 internally of which there is a seal generally indicated at 20.

Returning to the rotor body 12, this has embedded therein a winding or windings 21 made of superconducting material and copper, the rotor winding overhangs being shown at 22. Leads which extend from the slip rings 15 and 16 to the overhangs 22 of the rotor winding are diagrammatically shown at 29.

Immediately surrounding the rotor winding and supported on the rotor body is disposed an annular stainless steel vacuum enclosure 23 which at the non-drive end has an inwardly spun end 24, which differs slightly from the other end 26 of the vacuum enclosure. Disposed throughout the whole annular vacuum enclosure 23 are a plurality of tubes 27 which support the outer wall of the enclosure. The tubes 27 are preferably made of a resin bonded glass fiber material.

Immediately surrounding the vacuum enclosure is an annular shield 28 which completely encloses the rotor body and shields the rotor windings from alternating or suddenly changing magnetic fields which would otherwise be set up therein when the output power of the stator is unbalanced relative to three phases, or when a fault occurs in the transmission system. The shield 28 is therefore made of a good electrical conductor, such, for example, as copper or aluminum.

The shield is supported by the tubes 27 within the vacuum enclosure and these tubes have to support the shield against radial compressive forces set up during a fault in the transmission system associated with the generator. Such a fault will also set up torque forces, mainly of an oscillatory nature, within the shield which will thus tend to rotate with respect to the rotor body.

The shield is therefore preferably rotatably and resiliently mounted on the rotor body by means of supports 30 at both ends of the shield. These supports are such as to allow the shield to rotate from a central position by a predetermined peripheral distance in either direction with respect to the rotor body and to return the shield to its central position when the oscillatory torque forces cease. Details of the supports 30 are not shown.

Surrounding the shield 28 but spaced therefrom by an annular space 31 is an annular arrangement of three concentric spaced cylinders 32, 33 and 34. These cylinders are stationary and may therefore be carried by the stator. The cylinders completely surround the rotor and extend partially over the shaft ends 13 at each end of the machine so that the annular space 31 also extends to the shaft ends. The three concentric cylinders may be made of a glass ceramic such, for example, as one of those known by the R.T.M. MEXIM. The spaces between cylinders 32, 33 and 34 are closed by bellows generally indicated at 35, which allow for differential expansion of the cylinders. An annular membrane 45 extends between the bellows 35 and the seal 20 at each end of the machine so as to completely seal the space 31 and a pipe 46 connected to the non drive end membrane 45 allows the space 31 to be evacuated.

Between the two innermost cylinders 33 and 34 are annular seals 40 — one at each end of the machine, and the space between the outer cylinders 32 and 33 is evacuated and may be filled with superinsulation such, for example, as many layers of aluminized "Terylene" (R.T.M.) foil interspaced with glass cloth.

At both ends of the rotor there is provided at least one annular baffle as shown at 37. These baffles extend from the innermost cylinder 34 to near the rotor body.

Coolant is delivered to and exhausted from the rotor along the axis thereof. The coolant is delivered to the rotor through the non-drive shaft end conveyed directly to the drive end where it is then distributed radially outwards to the periphery of the rotor from where it is eventually exhausted through the non-drive shaft end. The coolant flow paths within the rotor will now be described in relation to FIGS. 1, 2 and 3.

In FIG. 1 the flow path of coolant entering the machine includes an inner axial path 141 and an annular radial path 142 by which coolant is delivered to the periphery of the rotor at the drive end. The periphery of the flow path 142 communicates with restrictor orifices 143, each of which communicates with a short radial duct 144 within the wall of the rotor body and the ducts 144 in turn communicate with axially extending ducts 145 and 146 also within the wall of the rotor body. The axially extending ducts 145 extend back to the non-drive end of the rotor body and the actual number of ducts 145 employed will depend upon the degree of cooling required and also upon the overall circumferential space occupied by the rotor winding as this may vary according to the nature of the rotor winding.

The axial ducts 146 extend towards the drive end of the rotor body and communicate with an annular radial flow path 147 which in turn communicates with a further axial flow path 149. The ducts 146 are disposed around the whole periphery of the rotor body.

Figure 2:
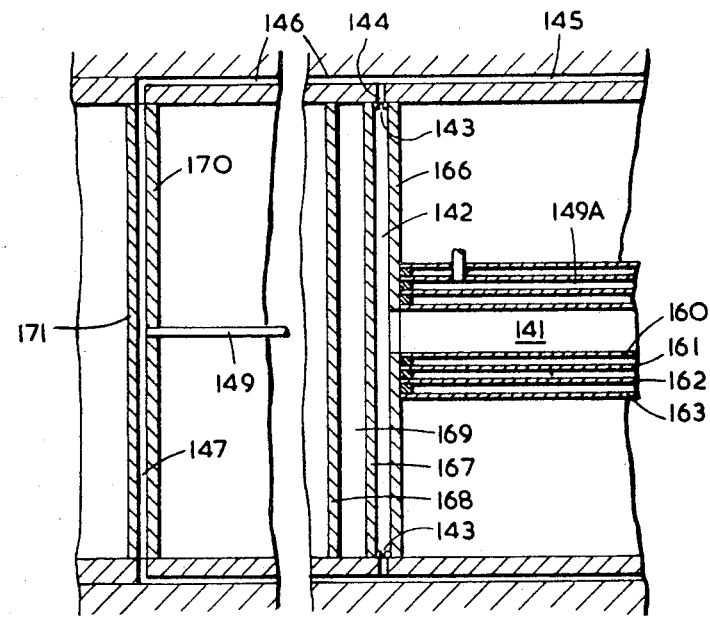

FIG. 2 is a diagrammatic section of the rotor between the lines A—A and B—B of FIG. 1 and shows the various ducts and flow paths in more detail. In FIG. 2 the references 160 to 163 indicate four stainless steel tubes concentrically mounted and secured along the axis of the rotor with the innermost tube 160 providing the coolant inlet flow path 141. The rotatable tube 160 connects with a stationary inlet tube by means of a rotary seal, but these two latter parts are not shown. The annular space between the tubes 160 and 161 is evacuated so as thermally to isolate the inlet flow path. The annular space between the tubes 161 and 162 provides a coolant outlet flow path 149A which is further described later, and the space between the tubes 162 and 163 is evacuated so as thermally to isolate the outlet flow path 149A from the interior of the rotor body.

The annular flow path 142 is provided between two of three stainless steel discs 166, 167 and 168. The annular space 169 between discs 167 and 168 is evacuated so as to provide thermal insulation between the flow path 142 and the drive end of the rotor. Around the periphery of the flow path 142 are the restrictor orifices 143 and the ducts 144 which connect with the axial ducts 145 and 146. The ducts 146 extend axially along the rotor body to the further annular flow path 147 which is provided between two further stainless steel discs 170 and 171.

The flow path 147 communicates with an axially disposed stainless steel tube 171 which provides the axial outlet flow path 149 which communicates with the outlet flow path 149A by means not shown. The outlet flow path 149 carries relatively warm coolant which has to be taken across the inlet flow path 142 which carries very cold coolant, and the flow path 149 has therefore to be isolated from the flow path 142.

Cooling medium is supplied along the tube 160 and is flung outwardly by centrifugal force in the flow path 142 where it will reach too high a pressure. The cooling medium is therefore throttled by the restrictor orifices 143 so that the cooling medium entering the ducts 145 and 146 has a desired pressure.

Cooling medium which flows in the ducts 146 and flow path 147 to the outlet path 149 prevents heating of the rotor by heat which would tend to flow into the rotor from the drive end thereof, and the evacuated space 169 provides a further barrier against heat entering the rotor.

The cooling medium which flows along the ducts 145 to the non-drive end of the rotor keeps the temperature of the rotor winding 21 at the low value at which it remains superconducting. Adjacent the end of the rotor winding at the non-drive end of the rotor the ducts 145 connect with radial ducts 180 (FIGS. 1 and 3) and further axially extending ducts 181 in the rotor body. It will be noted that the ducts 181 are adjacent the rotor winding leads 29. The ducts 180 connect with an annular radial outlet flow path 182 and the ducts 181 connect with radial outlet ducts 183 which connect with an annular radial outlet flow path 184, which in turn connects with an axial outlet path 149B.

Figure 3:
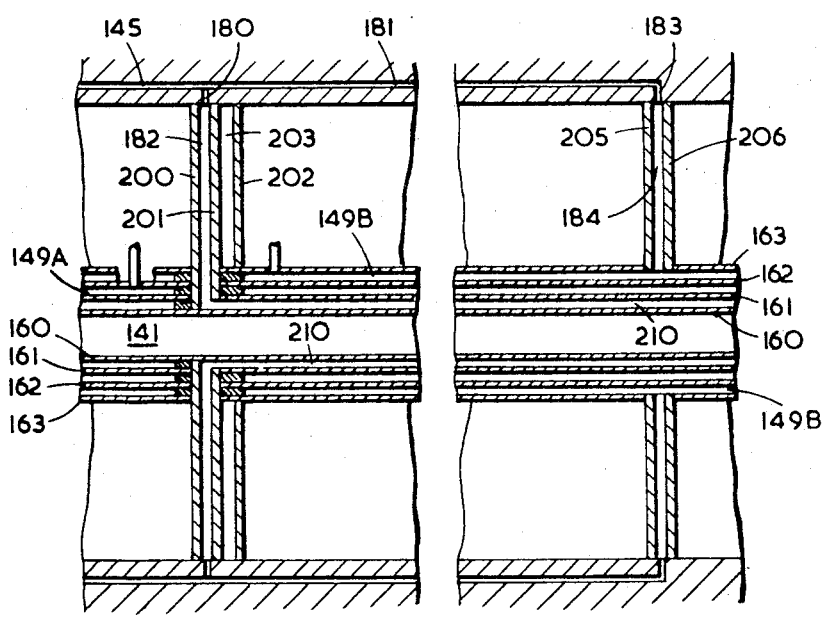

FIG. 3 diagrammatically shows further details of the parts 180 to 184 together with the arrangement whereby coolant is led back to the non-drive end of the rotor. The flow path 182 is provided between two stainless steel discs 200 and 201, and a third stainless steel disc 202 is spaced from the disc 201. The space 203 between the discs 201 and 202 is evacuated to provide thermal insulation between the flow path 182 and the non-drive end of the rotor. The annular flow path 184 is provided between two further stainless steel discs 205 and 206 and this flow path helps to prevent heating of the rotor by heat which would tend to flow from the non-drive end thereof. The coolant exhausting from the flow path 182 is at a temperature below that of the coolant entering the rotor along the tube 160, as is described later, and the flow path 182 is connected with the annular space between the tubes 160 and 161 in a coolant outlet flow path 210 on the right-hand side of the disc 200. At this position the annular space between the tubes 161 and 162 is evacuated to provide thermal insulation between the path 210 conveying cold coolant and the path 149B which carries relatively much warmer coolant. The outlet path 210 connects with a stationary outlet tube by means of a rotary seal, but these two latter parts are not shown.

The outlet flow path 182, like the path 142, is a complete annular space and thus the outlet flow path 149A must be taken through the annular path 182 in a manner which isolates it from the path 182. As far as the present invention is concerned it is considered sufficient to say that the annular flow path 149A on the left-hand side of the flow path 182 connects with the annular flow path 149B on the right-hand side of the path 182. From the junction of the ducts 145 and 180 the ducts 181 are arranged in the same way as the ducts 146 and connect with the radial duct 183 and the flow path 184, which in turn connects with the outlet flow path 149B. The flow path 149B extends through the shaft end to communicate with a stationary outlet pipe 49 (FIG. 1) sealed to the path 149B by a rotary seal 48.

"ROTOR COOLING AND OPERATION"

The rotor cooling arrangement includes several separate systems. Firstly, there is a system in which a small flow of liquid nitrogen is maintained in the annular space between cylinders 33 and 34, the nitrogen being limited to that part of the space between the seals 40. Details of means for supplying the nitrogen are not disclosed in FIG. 1 and nitrogen is limited to the space between seals 40 since beyond the seals the cylinders 32, 33 and 34 are in any event at room temperature. The space between cylinders 32 and 33 is evacuated to prevent excessive heat leak to the liquid nitrogen. If desired this leak may be further reduced by including within the evacuated space thermal insulation of a type in which eddy current loss due to the rotating field is small.

In turn the shield 28 is thermally isolated from the coil by the stainless steel vacuum enclosure 23.

The space 31 enclosed by the glass-ceramic tubes, the bellows 35, and the diaphragm 45 is evacuated by a pump connected to the pipe 46 and the space filled with helium gas at a very low pressure, windage losses are thus greatly reduced. The sloping ends of shield and rotor body whirl the helium gas in 31 outwards but the baffle plates 37 restrict the gas circulation to the cold region and thus largely prevent heat exchange with parts near room temperature, such as at 45. Air will of course tend to leak into the space 31 and the near vacuum conditions will therefore have to be maintained. It may be necessary to provide one or more ducts in the seals 20 through which helium gas is circulated and to maintain helium gas over the seal oil supply so as to exclude air leaks into the space 31.

The main cooling of the whole rotor body and its winding is provided by liquid helium at a pressure of about 1 bar at 4.2° K which is supplied to the rotor along the rotary inlet tube 160. The liquid helium is thus fed to the flow space 142 where it is flung outwardly to the ends of the flow space and reaches a pressure of about 17 bars. This pressure is reduced by the restricter orifices 143 to a pressure of about 1.6 bars.

From the orifices 143 the major part of the helium flows axially along ducts 145 so as to cool the rotor winding and a small part of the helium flows in the ducts 146 and flow path 147 as described. At the other end of the rotor some of the helium passes from the ducts 145 into the ducts 181 and helium in these latter ducts cools the adjacent parts of the leads 29.

The pumping action of the flow space 142 is relied upon to draw the liquid helium into the rotor. In addition, pumping to draw the coolant out along the outlet path 210 may be necessary, to reduce the highest temperature reached by the coolant in the ducts adjacent the rotor winding depending upon the material from which the superconducting winding is made.

In passing through the rotor the helium passes from the liquid state, through the supercritical state, to the gaseous state and the gas in the outlet paths 149, 149A and 149B is at a temperature of about 90° K. The gas at the outlet ends of the ducts 145 is at a temperature of about 6.25° K at a pressure of 1.56 bars. However, this temperature can only be maintained if the pressure is reduced in flow path 182 since otherwise centrifugal action would tend to compress and so heat the gas. The gas may thus be pumped from the outlet path 210 so that it is at a pressure of about 0.3 bars between the points where it approaches the rotor axis and is eventually exhausted from the rotor. At this pressure the gas approaching the rotor axis is at a temperature of about 3.17° K but within the duct 210 it is in contact with the thermal inlet duct 141 and so warms to a temperature close to 4.2° K.

The interior of the rotor body 12 is filled with helium gas at about 1 bar as other gases, such as air, would solidify onto the very cold parts of the rotor. Means whereby the interior of the rotor is filled with the helium gas is not disclosed but a controlled leakage from a suitable part of the helium flow path could be employed.

The radial depth of the ducts 145, 146 and 181 is made greater than necessary to carry the fluid helium which thus flows near the outer walls of the ducts, because of centrifugal force. Thus space is left for expansion of the fluid should it become heated due to heating up of the rotor coil.

Currents are induced to flow in the shield when some faults occur in the associated electrical transmission system, or when a voltage is applied to the rotor winding to change output power of the machine. A torque is then exerted on the shield relative to the rotor body which may reach 5.4 times the full load torque of the machine. As this torque is mainly oscillatory the mounting 30 whereby the shield can rotate relative to the rotor body is provided.

The shell must also be mechanically strong since the worst hoop stress in the shell is 30 tons/in$^2$, which is beyond the capability of pure copper, and strengthening is necessary. Several methods are known of giving much greater strength with good electrical conductivity, such as dispersion and precipitation hardening, adding steel wires within the shell or winding steel wires or glass or carbon fibers on the outside.

The electrical time constant of the shield is about 4 seconds, and magnetic coupling with the coil is close. Thus only slow changes of flux can occur in the coil, and hardly any power is dissipated in it. Some heat, however, leaks through the vacuum enclosure, 23, along the shaft and along the current leads. The average temperature of the shell is governed by equilibrium between heat leaks from it on the one hand and heat generated within it on the other hand.

The thermal resistance to heat flow to the cylinder 34 through the space 31 is relatively small, so the shield 28 tends to stay at a temperature close to that of the liquid nitrogen. This is helpful in stabilizing the gas flow.

The shield is heated by currents induced in it during a fault. If the fault occurs in the associated electrical transmission system it is normally cleared in 0.5 second and little heating occurs. However, a fault on the low voltage side of the system may not be cleared for 2.0 seconds and if it is of the type of fault which causes severe negative sequence currents to flow in the stator the temperature of the shield will, in this extreme case rise by 15° K. Positive sequence currents in the stator cause smaller temperature rises in the shield since the direct currents induced therein are not so effective in heating the shield. These currents decay somewhat during 2 seconds, and are able to penetrate the whole thickness of the wall of the shield.

The rotor is normally operated with current supplied to the rotor coils but the possibility of having a continuously circulated field current within the superconducting winding exists. However, this would mean the provision of a heavy duty switch within the rotor unless the field current could be initially induced into the rotor field.

When the output of the machine is to be changed, a control system injects a voltage of short duration into the coil circuit to raise or lower the field. The rotor inductance is about 2.8H, but rapid changes of coil current occur, balanced by currents induced in the shield. The rate of change of current in the winding is determined by the control voltage and by the leakage inductance due to flux between the shield and the winding, which is about 0.4 henry. The speed of response obtained with a control voltage of 1,000V is at least as fast as in a conventional machine.

If it is not convenient to introduce a negative voltage to reduce the rotor MMF, a resistor of perhaps 1 ohm may be switched into the rotor circuit, and switched out again when the MMF approaches the desired lower value.

ROTOR WINDINGS

Figure 4:
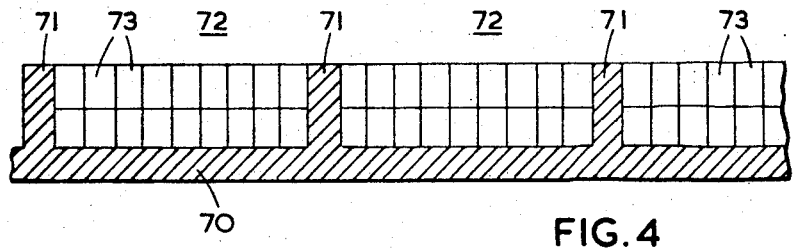
FIG. 4 shows a section through part of the rotor winding. This FIG. being shown has a straight extended section which in practice would of course be arcuate.

The superconducting winding may be arranged in a number of different ways and is preferably disposed in winding slots, such as are shown in FIG. 4. In this figure, the reference 70 indicates a section through the rotor body which although, of course, arcuate is, in FIG. 4, shown as being flat. Extending outwardly from the rotor body 70 are integral spacers 71 leaving winding slots 72 therebetween. Within each slot 72 there are diagrammatically shown 18 superconductor conductors 73 arranged in two layers of nine conductors each. The outer periphery of the winding is covered by means (not shown), but which may comprise for example, an integral part of the rotor body, a glass-resin cylinder or glass-resin tape.

Figure 5:
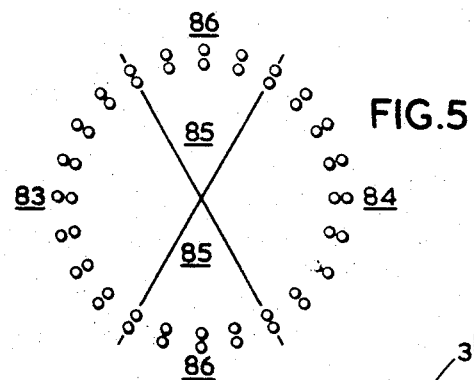
FIG. 5 shows the end arrangement of a winding which will cause the stator to produce a near sinusoidal output from a trapezoidal energization as shown in FIG. 6.
Figure 6:
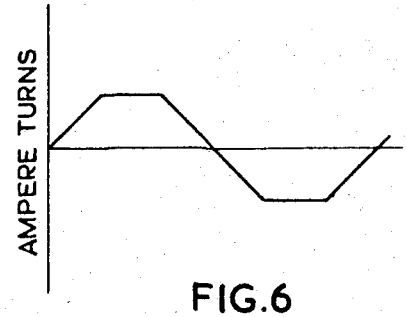

The rotor winding may be similar to that of a normal two-pole alternating current generator. The end of such a winding is diagrammatically shown in FIG. 5 and consists of axially extending polar winding 83, 84, two conductors deep and accommodated in 120° of the rotor surface, there being two 60° blank spaces 85 between go and return paths. End connections between the windings are nor shown. The individual conductors of this winding are linearly arranged, that is, they are equally spaced and this winding produces rotor ampere turns such as is shown in FIG. 6 and causes the stator to generate substantially the normal sinusoidal output. A quadrature axis winding shown at 86 may be provided in the spaces 85 to enable the direction of the rotor MMF relative to the rotor body to be changed by up to 60°. This may be useful in improving the stability of the machine. It is not normally practicable to provide this facility on a conventional machine because it is difficult to find space within the end bells for the extra winding ends.

Figure 7:
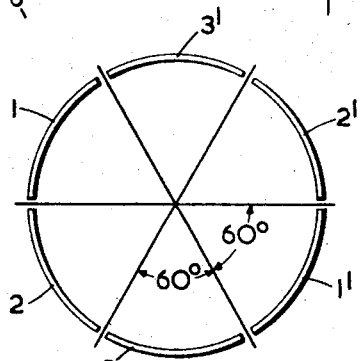
FIG. 7 illustrates diagrammatically an arrangement of the rotor winding which includes a conventional winding and also a quadrature axis winding.

FIG. 7 shows diagrammatically the end of a winding arrangement in which three coils are each confined to 60° of the rotor and the ends of these coils are shown at 1 and $1^1$, 2 and $2^1$, 3 and $3^1$.

Figure 8:
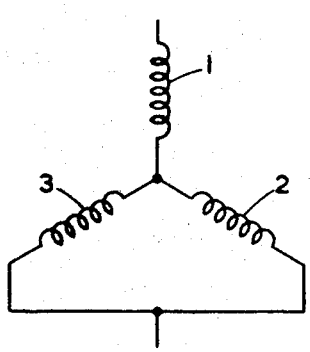
FIG. 8 is a circuit diagram of a winding similar to FIG. 7 also having a quadrature axis winding and causes the rotor to produce ampere turns energization of the wave form shown in FIG. 9.
Figure 9:
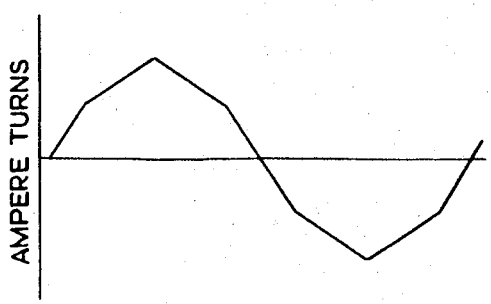

If the coils are connected as shown in FIG. 8 the form of the MMF they produce is as shown in FIG. 9, and this gives the same, nearly sinusoidal, waveform at the stator as does the MMF shown in FIG. 6. A shift of 60° in the direction of the rotor MMF relative to the rotor body may then be accomplished by changing the connections such that the current enters by coil 2 and leaves by coils 1 and 3, or alternatively enters by coil 3 and leaves by coils 1 and 2.

The above described windings may all be accommodated in slots in the manner described in relation to FIG. 4.

In another form of winding the turns of a single winding are such that the form of the MMF around the circumference of the rotor is sinusoidal. This gives a purely sinusoidal voltage at the stator but is more difficult to construct.

The rotor winding can be made of any one or more of the available superconducting materials, having regard to their suitability. The characteristics of, and difficulties experienced with, superconducting materials are sufficiently well known not to require explanation and only one conductor suitable for use with the present invention will be described.

This conductor is rectangular, being 3 mm by 5 mm and is comprised of 1,525 strands, each of which comprises an inner filament of Nb-Ti of $1.97 \times 10^{-5}$ cm$^2$ cross-section surrounded by a stabilizing copper sheath of $5.9 \times 10^{-5}$ cm$^2$ cross-section, which in turn is surrounded by a coating of cupro-nickel of $1.97 \times 10^{-5}$ cm$^2$ cross-section. Each strand is twisted through 360° in every 10 cm to reduce eddy currents due to relatively slow changes of magnetic field and the cupro-nickel coating gives each strand a relatively high transverse resistance so that the whole conductor has a similarly high transverse resistance which reduces the generation of eddy currents due to relatively fast changes of magnetic field.

This conductor has a critical temperature of 9.2° K at zero current and field and a critical temperature of 7.6° K under full load conditions of operation of the rotor. The necessity for pumping out the gaseous helium so that it does not rise to the temperature of 7.6° K adjacent the rotor winding will thus be appreciated.

Clearly, any other conductor having a higher critical temperature and still suitable in other respects would be advantageous.

I claim:

1. A synchronous dynamo electric machine having a stator and a rotor, in which the rotor has a superconductive direct current field winding which is maintained at a very low temperature, including an outer annular shield of good electrically conducting material mounted on the rotor and extending beyond the ends of the rotor winding for shielding the rotor winding from alternating or suddenly changing magnetic fields which would otherwise be set up therein by the stator.

2. A machine according to claim 1, in which the shield is resiliently and rotatably mounted on the rotor body so as to allow the shield to rotate a predetermined amount from a central position in either direction relative to the rotor body.

3. A machine according to claim 1, including means for supporting the shield on the rotor body so that the shield resists radial forces which would tend to compress it.

4. A machine according to claim 1, in which the body of the rotor is in the form of a hollow cylinder of electrically insulating material and has a metal shaft end secured to each end thereof.

5. A machine according to claim 4, in which the rotor windings are embedded in the wall of the rotor body.

6. A machine according to claim 1 in which the body of the rotor is in the form of a hollow cylinder and the rotor windings are embedded in the wall of the rotor body, including a first set of ducts in the wall of the rotor body for the passage of a coolant for maintaining the rotor winding at the said very low temperature, this first set of ducts being disposed adjacent the rotor windings and extending substantially the whole length thereof.

7. A machine according to claim 6 in which the coolant is liquid helium initially supplied to the rotor at a temperature of about 4.2° K.

8. A machine according to claim 7 including an axially extending inlet duct carried by the rotor and to which the coolant is supplied at the non-drive end of the rotor.

9. A machine according to claim 8 in which the inlet duct extends towards the drive end of the rotor for supplying the coolant directly to the said drive end.

10. A machine according to claim 9, including a first annular flow path within the rotor body near the drive end thereof, this annular flow path extending between the inlet duct and the first set of ducts in the wall of the rotor body.

11. A machine according to claim 10, in which the first annular flow path acts to pump coolant through the rotor, and including restrictor orifices at the periphery of the annular flow path for reducing, to a predetermined value, the pressure of coolant leaving the annular flow path.

12. A machine according to claim 11, including a second set of ducts in the wall of the rotor body, these ducts extending axially from the restrictor orifices further towards the drive end of the rotor, a second annular flow path which extends from the axially outer ends of the second set of ducts to the axis of the rotor, and a first axial outlet duct which extends from the inner periphery of the second annular flow path towards the non-drive end of the rotor, coolant flowing in the second set of ducts and the second annular flow path thus reducing the amount of heat entering the rotor body and reaching the first annular flow path.

13. A machine according to claim 12, including an evacuated annular chamber adjacent the face of the first annular flow path nearest to the drive end of the rotor.

14. A machine according to claim 13, including a third annular flow path extending from the first set of ducts at the non-drive end of the rotor towards the axis thereof, and a second axial outlet duct which extends axially from the inner periphery of the third annular flow path towards the non-drive end of the rotor.

15. A machine according to claim 14, including an evacuated annular chamber adjacent the face of the third annular flow path nearest to the non-drive end of the rotor.

16. A machine according to claim 15, including a third set of ducts in the periphery of the rotor wall at the non-drive end of the rotor body, these ducts extending from the end of the first set of ducts, a fourth annular flow path which extends from the axially outer end of the third set of ducts towards the axis of the rotor and a third axially extending outlet duct which extends from the inner periphery of the fourth annular flow path towards the non-drive end of the rotor, coolant flowing in the third set of ducts and the fourth annular flow path thus reducing the amount of heat which can enter the rotor body and reach the third annular flow path.

17. A machine according to claim 16, in which the first axially extending outlet duct communicates with the third axially extending outlet duct.

18. A machine according to claim 17, in which the leads for the rotor winding are disposed in the wall of the rotor body adjacent the third set of ducts, whereby coolant in the third set of ducts cools the rotor winding leads.

19. A machine according to claim 18, including an annular vacuum chamber of a non-magnetic material disposed between the outer periphery of the rotor body and the inner periphery of the shield, the vacuum vessel and the shield being substantially of the same axial length.

20. A machine according to claim 14, in which helium flowing from the first set of ducts into the third annular flow path is in the gaseous state, this gas being pumped out of the rotor through the second axially extending outlet duct so as to reduce the pressure of the gas to a value at which centrifugal pumping action of the third annular flow path will not cause excessive heating of the gaseous helium therein.

21. A machine according to claim 7, in which the interior of the rotor body is filled with helium gas at a pressure of about one bar.

22. A machine according to claim 1, in which the direct current field winding is in the form of a polar axis winding and including quadrature axis windings.

23. A machine according to claim 1, in which the direct current field winding provides a sinusoidal form M.M.F. around the circumference of the rotor.

24. A machine according to claim 1, in which the rotor rotates in a chamber filled with helium gas at a very low pressure.

25. A machine according to claim 24, in which the chamber includes three concentrically arranged cylinders of electrically insulating material supported on the stator of the machine and extending between the two shaft ends of the rotor, means for sealing the spaces between the outer and intermediate cylinders and the intermediate and inner cylinders, and means for sealing the inner cylinder about the two shaft ends.

26. A machine according to claim 25, in which the space between the outer and the intermediate cylinders is evacuated.

27. A machine according to claim 26, in which the space between the outer and intermediate cylinders is filled with thermally insulating material.

28. A machine according to claim 25, in which the space between the intermediate and inner cylinders is filled with a cold fluid for reducing heat flow into the chamber.

29. A machine according to claim 28, including seals for preventing the cold fluid reaching the extreme ends of the space between the intermediate and inner cylinders, thereby reducing the heat flow into the axially inner part of this space.

30. A machine according to claim 24, in which at each end of the chamber there is provided at least one annular baffle which extends from the inner face of the chamber to near the outer surface of the rotor so as to limit swirling motion of the helium gas within the chamber and thus reduce heat transport by the gas from the axially outer parts of the chamber to the axially inner part thereof.

31. A turbogenerator, comprising
a rotor having a core;
a carrier cylinder of non-magnetic material enclosing said core;
a plurality of holding members of poor thermal conductivity affixing said carrier cylinder to said core; and
a rotary excitation winding affixed to said carrier cylinder on a surface of said carrier cylinder facing said core, said carrier cylinder and excitation winding being spaced from said core to form a vacuum chamber therebetween, said vacuum chamber providing thermal insulation, said holding members extending through said vacuum chamber, said excitation winding having conductors of high field superconducting material and conductors of normal conducting material having good electrical conductivity properties at operating temperatures, the normal conducting conductors being arranged so that alternating currents which occur in said excitation winding during the operation of said turbogenerator occur only in said normal conducting conductors.

32. A turbogenerator as claimed in claim 31, wherein said carrier cylinder comprises fiber-reinforced synthetic material.

33. A turbogenerator as claimed in claim 31, further comprising a damping cylinder of non-magnetic normal conducting material affixed to said core and surrounding said carrier cylinder.

34. A turbogenerator as claimed in claim 31, further comprising a rotor shaft extending from one end of said core and having an axis, coolant supply means for supplying coolant to said excitation winding coolant duct unit, said coolant supply means comprising a tubular supply duct coaxial with the axis of said rotor shaft extending in axial direction from one end of said rotor shaft into said core and through said core to said excitation winding coolant duct unit, coolant removal means for removing coolant from said excitation winding coolant duct unit, said coolant removal means comprises another tubular duct coaxially surrounding said supply duct and extending from said excitation winding coolant duct unit through said core to said rotor shaft and through said rotor shaft to said one end of said rotor shaft, and thermal insulating means around said coolant supply means and said coolant removal means for insulating said coolant supply means and said coolant removal means from each other, from said rotor shaft and from said core.

35. A turbogenerator as claimed in claim 31, wherein said conductors of high field superconducting material comprise superconducting wires parallel to and spaced from each other.

36. A turbogenerator as claimed in claim 34, wherein said thermal insulating means comprises a vacuum chamber.

37. A turbogenerator as claimed in claim 31, wherein said excitation winding forms a single excitation winding coolant duct unit.

38. A turbogenerator as claimed in claim 37, wherein said excitation winding coolant duct unit comprises a tube of normal conducting material having a substantially rectangular cross-section formed by substantially planar inner surfaces, and a band of normal conducting material affixed to and extending along one of the inner surfaces of said tube and having a plurality of conductors of high field superconducting material embedded therein and extending therewith.

39. A turbogenerator as claimed in claim 37, further comprising a rotor shaft extending from one end of said core and having an axis, coolant supply means for supplying coolant to said excitation winding coolant duct unit, said coolant supply means comprising a tubular supply duct coaxial with the axis of said rotor shaft extending in axial direction from one end of said rotor shaft into said core and through said core to said excitation winding coolant duct unit, coolant removal means for removing coolant from said excitation winding coolant duct unit, said coolant removal means comprises another tubular duct coaxially surrounding said supply duct and extending from said excitation winding coolant duct unit through said core to said rotor shaft and through said rotor shaft to said one end of said rotor shaft, and thermal insulating means around said coolant supply means and said coolant removal means for insulating said coolant supply means and said coolant removal means from each other, from said rotor shaft and from said core.

40. A turbogenerator as claimed in claim 38, wherein said conductors of high field superconducting material comprise superconducting wir s parallel to and spaced from each other.

41. A machine according to claim 16 in which the first set of ducts (of claim 6), the second set of ducts (of claim 12) and the third set of ducts (of claim 16) are of greater cross-section than is necessary to carry the coolant so that space is left for expansion of the coolant should it become heated due to heating of the rotor windings.

42. A machine according to claim 6 in which the rotor winding comprises at least two separate windings which enable the direction of the rotor MMF to be changed relative to the rotor body by control of the currents flowing through these windings.

* * * * *